(12) United States Patent
Sambhwani et al.

(10) Patent No.: US 7,512,173 B2
(45) Date of Patent: *Mar. 31, 2009

(54) LOW I/O BANDWIDTH METHOD AND SYSTEM FOR IMPLEMENTING DETECTION AND IDENTIFICATION OF SCRAMBLING CODES

(75) Inventors: Sharad Sambhwani, San Diego, CA (US); Ghobad Heidari, San Diego, CA (US)

(73) Assignee: QST Holdings, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/724,076

(22) Filed: Mar. 13, 2007

(65) Prior Publication Data
US 2007/0153883 A1 Jul. 5, 2007

Related U.S. Application Data

(63) Continuation of application No. 10/295,692, filed on Nov. 14, 2002, now Pat. No. 7,215,701, which is a continuation-in-part of application No. 10/015,531, filed on Dec. 12, 2001, now Pat. No. 7,088,825.

(51) Int. Cl.
*H04B 1/00* (2006.01)
(52) U.S. Cl. ....................................... 375/150
(58) Field of Classification Search ................. 375/142, 375/143, 150, 152, 343, 147, 316; 370/335, 370/342; 708/422, 423, 424, 425, 426
See application file for complete search history.

(56) References Cited
U.S. PATENT DOCUMENTS
3,409,175 A 11/1968 Byrne
(Continued)

FOREIGN PATENT DOCUMENTS
DE 100 18 374 A1 10/2001
(Continued)

OTHER PUBLICATIONS

Abnous et al., "Ultra-Low-Power Domain-Specific Multimedia Processors," VSLI Signal Processing, IX, 1998, IEEE Workshop in San Francisco, CA, USA, Oct. 30-Nov. 1, 1998, pp. 461-470 (Oct. 30, 1998).

(Continued)

*Primary Examiner*—Sam K Ahn
(74) *Attorney, Agent, or Firm*—Nixon Peabody LLP

(57) ABSTRACT

A system for detecting and identifying the identity of a base station or cell which transmits a scrambling code is provided. According to one aspect of the system, the system is used to perform scrambling code detection of eight (8) primary cells (each scrambling code's X-component being spaced sixteen (16) chips apart) in a group. According to another aspect of the system, a single scrambling code generator is used to generate a master scrambling code. The master scrambling code is then used to create individual scrambling codes which are used in correlation with received signals to detect in parallel which one of the eight (8) possible primary cells in the group transmitted the received signals. According to yet another aspect of the system, each of the correlators maintains a corresponding X-component segment of the master scrambling code. For every sixteen (16) chips, a new X-component segment of the master scrambling code is introduced into one of the correlators, a X-component segment of the master scrambling code is dropped from another correlator, and X-component segments of the master scrambling code are sequentially shifted or propagated through the remaining correlators; and concurrent correlations are performed by the correlators using their respective corresponding X-component segments of the master scrambling code and newly received signals.

49 Claims, 8 Drawing Sheets

U.S. PATENT DOCUMENTS

| | | |
|---|---|---|
| 3,666,143 A | 5/1972 | Weston |
| 3,938,639 A | 2/1976 | Birrell |
| 3,949,903 A | 4/1976 | Benasutti et al. |
| 3,960,298 A | 6/1976 | Birrell |
| 3,967,062 A | 6/1976 | Dobias |
| 3,991,911 A | 11/1976 | Shannon et al. |
| 3,995,441 A | 12/1976 | McMillin |
| 4,076,145 A | 2/1978 | Zygiel |
| 4,143,793 A | 3/1979 | McMillin et al. |
| 4,172,669 A | 10/1979 | Edelbach |
| 4,174,872 A | 11/1979 | Fessler |
| 4,181,242 A | 1/1980 | Zygiel |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |
| 4,333,587 A | 6/1982 | Fessler et al. |
| 4,354,613 A | 10/1982 | Desai et al. |
| 4,377,246 A | 3/1983 | McMillin et al. |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,901,887 A | 2/1990 | Burton |
| 4,921,315 A | 5/1990 | Metcalfe et al. |
| 4,930,666 A | 6/1990 | Rudick |
| 4,932,564 A | 6/1990 | Austin |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,129,549 A | 7/1992 | Austin |
| 5,139,708 A | 8/1992 | Scott |
| 5,156,301 A | 10/1992 | Hassell et al. |
| 5,156,871 A | 10/1992 | Goulet et al. |
| 5,165,575 A | 11/1992 | Scott |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,240,144 A | 8/1993 | Feldman |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,339,428 A | 8/1994 | Burmeister et al. |
| 5,343,716 A | 9/1994 | Swanson et al. |
| 5,361,362 A | 11/1994 | Benkeser et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,212 A | 2/1995 | Grube et al. |
| 5,392,960 A | 2/1995 | Kendt et al. |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,623,545 A | 4/1997 | Childs et al. |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |
| 5,647,512 A | 7/1997 | deOliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |

| Patent | Date | Inventor |
|---|---|---|
| 5,699,328 A | 12/1997 | Ishizaki et al. |
| 5,701,482 A | 12/1997 | Harrison et al. |
| 5,704,053 A | 12/1997 | Santhanam |
| 5,706,191 A | 1/1998 | Bassett et al. |
| 5,706,976 A | 1/1998 | Purkey |
| 5,712,996 A | 1/1998 | Schepers |
| 5,720,002 A | 2/1998 | Wang |
| 5,721,693 A | 2/1998 | Song |
| 5,721,854 A | 2/1998 | Ebicioglu et al. |
| 5,732,563 A | 3/1998 | Bethuy et al. |
| 5,734,808 A | 3/1998 | Takeda |
| 5,737,631 A | 4/1998 | Trimberger |
| 5,742,180 A | 4/1998 | DeHon et al. |
| 5,742,821 A | 4/1998 | Prasanna |
| 5,745,366 A | 4/1998 | Highma et al. |
| RE35,780 E | 5/1998 | Hassell et al. |
| 5,751,295 A | 5/1998 | Becklund et al. |
| 5,754,227 A | 5/1998 | Fukuoka |
| 5,758,261 A | 5/1998 | Weideman |
| 5,768,561 A | 6/1998 | Wise |
| 5,778,439 A | 7/1998 | Trimberger et al. |
| 5,784,636 A | 7/1998 | Rupp |
| 5,787,237 A | 7/1998 | Reilly |
| 5,790,817 A | 8/1998 | Asghar et al. |
| 5,791,517 A | 8/1998 | Avital |
| 5,791,523 A | 8/1998 | Oh |
| 5,794,062 A | 8/1998 | Baxter |
| 5,794,067 A | 8/1998 | Kadowaki |
| 5,802,055 A | 9/1998 | Krein et al. |
| 5,818,603 A | 10/1998 | Motoyama |
| 5,822,308 A | 10/1998 | Weigand et al. |
| 5,822,313 A | 10/1998 | Malek et al. |
| 5,822,360 A | 10/1998 | Lee et al. |
| 5,828,858 A | 10/1998 | Athanas et al. |
| 5,829,085 A | 11/1998 | Jerg et al. |
| 5,835,753 A | 11/1998 | Witt |
| 5,838,165 A | 11/1998 | Chatter |
| 5,845,815 A | 12/1998 | Vogel |
| 5,860,021 A | 1/1999 | Klingman |
| 5,862,961 A | 1/1999 | Motta et al. |
| 5,870,427 A | 2/1999 | Teidemann, Jr. et al. |
| 5,873,045 A | 2/1999 | Lee et al. |
| 5,881,106 A | 3/1999 | Cartier |
| 5,884,284 A | 3/1999 | Peters et al. |
| 5,886,537 A | 3/1999 | Macias et al. |
| 5,887,174 A | 3/1999 | Simons et al. |
| 5,889,816 A | 3/1999 | Agrawal et al. |
| 5,890,014 A | 3/1999 | Long |
| 5,892,900 A | 4/1999 | Ginter et al. |
| 5,892,961 A | 4/1999 | Trimberger |
| 5,894,473 A | 4/1999 | Dent |
| 5,901,884 A | 5/1999 | Goulet et al. |
| 5,903,886 A | 5/1999 | Heimlich et al. |
| 5,907,285 A | 5/1999 | Toms et al. |
| 5,907,580 A | 5/1999 | Cummings |
| 5,910,733 A | 6/1999 | Bertolet et al. |
| 5,912,572 A | 6/1999 | Graf, III |
| 5,913,172 A | 6/1999 | McCabe et al. |
| 5,917,852 A | 6/1999 | Butterfield et al. |
| 5,920,801 A | 7/1999 | Thomas et al. |
| 5,931,918 A | 8/1999 | Row et al. |
| 5,933,642 A | 8/1999 | Greenbaum et al. |
| 5,940,438 A | 8/1999 | Poon et al. |
| 5,949,415 A | 9/1999 | Lin et al. |
| 5,950,011 A | 9/1999 | Albrecht et al. |
| 5,950,131 A | 9/1999 | Vilmur |
| 5,951,674 A | 9/1999 | Moreno |
| 5,953,322 A | 9/1999 | Kimball |
| 5,956,518 A | 9/1999 | DeHon et al. |
| 5,956,967 A | 9/1999 | Kim |
| 5,959,811 A | 9/1999 | Richardson |
| 5,959,881 A | 9/1999 | Trimberger et al. |
| 5,963,048 A | 10/1999 | Harrison et al. |
| 5,966,534 A | 10/1999 | Cooke et al. |
| 5,970,254 A | 10/1999 | Cooke et al. |
| 5,987,105 A | 11/1999 | Jenkins et al. |
| 5,987,611 A | 11/1999 | Freund |
| 5,991,302 A | 11/1999 | Berl et al. |
| 5,991,308 A | 11/1999 | Fuhrmann et al. |
| 5,993,739 A | 11/1999 | Lyon |
| 5,999,734 A | 12/1999 | Willis et al. |
| 6,005,943 A | 12/1999 | Cohen et al. |
| 6,006,249 A | 12/1999 | Leong |
| 6,016,395 A | 1/2000 | Mohamed |
| 6,021,186 A | 2/2000 | Suzuki et al. |
| 6,021,492 A | 2/2000 | May |
| 6,023,742 A | 2/2000 | Ebeling et al. |
| 6,023,755 A | 2/2000 | Casselman |
| 6,028,610 A | 2/2000 | Deering |
| 6,036,166 A | 3/2000 | Olson |
| 6,039,219 A | 3/2000 | Bach et al. |
| 6,041,322 A | 3/2000 | Meng et al. |
| 6,041,970 A | 3/2000 | Vogel |
| 6,046,603 A | 4/2000 | New |
| 6,047,115 A | 4/2000 | Mohan et al. |
| 6,052,600 A | 4/2000 | Fette et al. |
| 6,055,314 A | 4/2000 | Spies et al. |
| 6,056,194 A | 5/2000 | Kolls |
| 6,059,840 A | 5/2000 | Click, Jr. |
| 6,061,580 A | 5/2000 | Altschul et al. |
| 6,073,132 A | 6/2000 | Gehman |
| 6,076,174 A | 6/2000 | Freund |
| 6,078,736 A | 6/2000 | Guccione |
| 6,085,740 A | 7/2000 | Ivri et al. |
| 6,088,043 A | 7/2000 | Kelleher et al. |
| 6,091,263 A | 7/2000 | New et al. |
| 6,091,765 A | 7/2000 | Pietzold, III et al. |
| 6,094,065 A | 7/2000 | Tavana et al. |
| 6,094,726 A | 7/2000 | Gonion et al. |
| 6,111,893 A | 8/2000 | Volftsun et al. |
| 6,111,935 A | 8/2000 | Hughes-Hartogs |
| 6,115,751 A | 9/2000 | Tam et al. |
| 6,120,551 A | 9/2000 | Law et al. |
| 6,122,670 A | 9/2000 | Bennett et al. |
| 6,138,693 A | 10/2000 | Matz |
| 6,141,283 A | 10/2000 | Bogin et al. |
| 6,150,838 A | 11/2000 | Wittig et al. |
| 6,154,494 A | 11/2000 | Sugahara et al. |
| 6,157,997 A | 12/2000 | Oowaki et al. |
| 6,175,854 B1 | 1/2001 | Bretscher |
| 6,175,892 B1 | 1/2001 | Sazzad et al. |
| 6,181,981 B1 | 1/2001 | Varga et al. |
| 6,185,418 B1 | 2/2001 | MacLellan et al. |
| 6,192,070 B1 | 2/2001 | Poon et al. |
| 6,192,255 B1 | 2/2001 | Lewis et al. |
| 6,192,388 B1 | 2/2001 | Cajolet |
| 6,195,788 B1 | 2/2001 | Leaver et al. |
| 6,198,924 B1 | 3/2001 | Ishii et al. |
| 6,199,181 B1 | 3/2001 | Rechef et al. |
| 6,202,130 B1 | 3/2001 | Scales, III et al. |
| 6,219,697 B1 | 4/2001 | Lawande et al. |
| 6,219,756 B1 | 4/2001 | Kasamizugami |
| 6,219,780 B1 | 4/2001 | Lipasti |
| 6,223,222 B1 | 4/2001 | Fijolek et al. |
| 6,226,387 B1 | 5/2001 | Tewfik et al. |
| 6,230,307 B1 | 5/2001 | Davis et al. |
| 6,237,029 B1 | 5/2001 | Master et al. |
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,281,703 B1 | 8/2001 | Furuta et al. |
| 6,282,627 B1 | 8/2001 | Wong et al. |

| | | |
|---|---|---|
| 6,289,375 B1 | 9/2001 | Knight et al. |
| 6,289,434 B1 | 9/2001 | Roy |
| 6,289,488 B1 | 9/2001 | Dave et al. |
| 6,292,822 B1 | 9/2001 | Hardwick |
| 6,292,827 B1 | 9/2001 | Raz |
| 6,292,830 B1 | 9/2001 | Taylor et al. |
| 6,301,653 B1 | 10/2001 | Mohamed et al. |
| 6,305,014 B1 | 10/2001 | Roediger et al. |
| 6,311,149 B1 | 10/2001 | Ryan et al. |
| 6,321,985 B1 | 11/2001 | Kolls |
| 6,346,824 B1 | 2/2002 | New |
| 6,347,346 B1 | 2/2002 | Taylor |
| 6,349,394 B1 | 2/2002 | Brock et al. |
| 6,353,841 B1 | 3/2002 | Marshall et al. |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,456,996 B1 | 9/2002 | Crawford, Jr. et al. |
| 6,459,883 B2 | 10/2002 | Subramanian et al. |
| 6,473,609 B1 | 10/2002 | Schwartz et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,606,529 B1 | 8/2003 | Crowder, Jr. et al. |
| 6,615,333 B1 | 9/2003 | Hoogerbrugge et al. |
| 6,618,434 B2 | 9/2003 | Heidari-Bateni et al. |
| 6,640,304 B2 | 10/2003 | Ginter et al. |
| 6,653,859 B2 | 11/2003 | Sihlbom et al. |
| 6,675,265 B2 | 1/2004 | Barroso et al. |
| 6,691,148 B1 | 2/2004 | Zinky et al. |
| 6,711,617 B1 | 3/2004 | Bantz et al. |
| 6,718,182 B1 | 4/2004 | Kung |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,754,470 B2 | 6/2004 | Hendrickson et al. |
| 6,760,587 B2 | 7/2004 | Holtzman et al. |
| 6,766,165 B2 | 7/2004 | Sharma et al. |
| 6,778,212 B1 | 8/2004 | Deng et al. |
| 6,785,341 B2 | 8/2004 | Walton et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,865,664 B2 | 3/2005 | Budrovic et al. |
| 6,871,236 B2 | 3/2005 | Fishman et al. |
| 6,883,084 B1 | 4/2005 | Donohoe |
| 6,894,996 B2 | 5/2005 | Lee |
| 6,901,440 B1 | 5/2005 | Bimm et al. |
| 6,912,515 B2 | 6/2005 | Jackson et al. |
| 6,985,517 B2 * | 1/2006 | Matsumoto et al. ......... 375/152 |
| 6,986,021 B2 | 1/2006 | Master et al. |
| 6,988,139 B1 | 1/2006 | Jervis et al. |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,249,242 B2 | 7/2007 | Ramchandran |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 * | 2/2002 | Tsuneki et al. .............. 370/335 |
| 2002/0024993 A1 | 2/2002 | Subramanian et al. |
| 2002/0031166 A1 | 3/2002 | Subramanian et al. |
| 2002/0032551 A1 | 3/2002 | Zakiya |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |
| 2002/0107962 A1 | 8/2002 | Richter et al. |
| 2002/0119803 A1 | 8/2002 | Bitterlich et al. |
| 2002/0120672 A1 | 8/2002 | Butt et al. |
| 2002/0138716 A1 | 9/2002 | Master et al. |
| 2002/0141489 A1 * | 10/2002 | Imaizumi .................... 375/150 |
| 2002/0147845 A1 | 10/2002 | Sanchez-Herrero et al. |
| 2002/0159503 A1 | 10/2002 | Ramachandran |
| 2002/0162026 A1 | 10/2002 | Neuman et al. |
| 2002/0168018 A1 | 11/2002 | Scheuermann |
| 2002/0181559 A1 | 12/2002 | Heidari-Bateni et al. |
| 2002/0184291 A1 | 12/2002 | Hogenauer |
| 2002/0184498 A1 | 12/2002 | Qi |
| 2002/0191790 A1 | 12/2002 | Anand et al. |
| 2003/0007606 A1 | 1/2003 | Suder et al. |
| 2003/0012270 A1 | 1/2003 | Zhou et al. |
| 2003/0018446 A1 | 1/2003 | Makowski et al. |
| 2003/0018700 A1 | 1/2003 | Giroti et al. |
| 2003/0023830 A1 | 1/2003 | Hogenauer |
| 2003/0026242 A1 | 2/2003 | Jokinen et al. |
| 2003/0030004 A1 | 2/2003 | Dixon et al. |
| 2003/0046421 A1 | 3/2003 | Horvitz et al. |
| 2003/0061260 A1 | 3/2003 | Rajkumar |
| 2003/0061311 A1 | 3/2003 | Lo |
| 2003/0063656 A1 * | 4/2003 | Rao et al. ................... 375/142 |

| | | | |
|---|---|---|---|
| 2003/0076815 A1 | 4/2003 | Miller et al. | |
| 2003/0099223 A1* | 5/2003 | Chang et al. | 370/342 |
| 2003/0102889 A1 | 6/2003 | Master et al. | |
| 2003/0105949 A1 | 6/2003 | Master et al. | |
| 2003/0110485 A1 | 6/2003 | Lu et al. | |
| 2003/0142818 A1 | 7/2003 | Raghunathan et al. | |
| 2003/0154357 A1 | 8/2003 | Master et al. | |
| 2003/0163723 A1 | 8/2003 | Kozuch et al. | |
| 2003/0172138 A1 | 9/2003 | McCormack et al. | |
| 2003/0172139 A1 | 9/2003 | Srinivasan et al. | |
| 2003/0200538 A1 | 10/2003 | Ebeling et al. | |
| 2003/0212684 A1 | 11/2003 | Meyer et al. | |
| 2004/0006584 A1 | 1/2004 | Vandeweerd | |
| 2004/0010645 A1 | 1/2004 | Scheuermann et al. | |
| 2004/0015970 A1 | 1/2004 | Scheuermann | |
| 2004/0025159 A1 | 2/2004 | Scheuermann et al. | |
| 2004/0057505 A1 | 3/2004 | Valio | |
| 2004/0062300 A1 | 4/2004 | McDonough et al. | |
| 2004/0081248 A1 | 4/2004 | Parolari | |
| 2004/0093479 A1 | 5/2004 | Ramchandran | |
| 2004/0168044 A1 | 8/2004 | Ramchandran | |
| 2005/0166038 A1 | 7/2005 | Wang et al. | |
| 2005/0198199 A1 | 9/2005 | Dowling | |
| 2006/0031660 A1 | 2/2006 | Master et al. | |

FOREIGN PATENT DOCUMENTS

| | | |
|---|---|---|
| EP | 0 301 169 A1 | 2/1989 |
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |
| EP | 0 768 602 A2 | 4/1997 |
| EP | 0 817 003 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1981 |
| GB | 2 237 908 A | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |
| WO | WO 93/13603 A1 | 7/1993 |
| WO | WO 95/11855 A1 | 5/1995 |
| WO | WO 96/33558 A1 | 10/1996 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

Aggarwal et al.., "Efficient Huffman Decoding," International Conference on Image Processing IEEE 1:936-939 (Sep. 10-13, 2000).

Allan et al., "Software Pipelining," ACM Computing Surveys, 27(3):1-78 (Sep. 1995).

Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).

Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).

Bacon et al., "Compiler Transformations for High-Performance Computing," ACM Computing Surveys 26(4):368-373 (Dec. 1994).

Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).

Banerjee et al., "A MATLAB Compiler for Distributed, Heterogeneous, Reconfigurable Computing Systems," 2000 IEEE Symposium, pp. 39-48, (Apr. 17-19, 2000).

Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).

Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).

Becker et al., "An Application-Tailored Dynamically Reconfigurable Hardware Architecture for Digital Baseband Processing," IEEE Conference Proceedings Article pp. 341-346 (Sep. 18, 2000).

Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).

Bevstar, BevStar Bottled Water Model Advertisement *Automatic Merchandiser* at www.AMonline.com (2005).

Bevstar, BevStar Point of Use Water Model Advertisement *Automatic Merchandiser* at www.AMonline.com (2005).

Bishop & Loucks, "A Heterogeneous Environment for Hardware/Software Cosimulation," Proceedings of the 30th Annual Simulation Symposium, pp. 14-22 (Apr. 7-9, 1997).

Brakensiek et al., "Re-Configurable Multi-Standard Terminal for Heterogeneous Networks," Radio and Wireless Conference, Rawcon 2002 IEEE. pp. 27-30 (2002).

Brown et al., "Quick PDA Data Exchange," PC Magazine pp. 1-3 (May 22, 2001).

Buck et al., "Ptolemy: A Framework for Simulating and Prototyping Heterogeneous Systems," International Journal of Computer Simulation 4:155-182 (Apr. 1994).

Burns et al., "A Dynamic Reconfiguration Run-Time System," Proceedings of the 5th Annual Symposium on Field- Programmable Custom Computing Machines, pp. 166-175 (Apr. 16, 1997).

Business Wire, "Whirlpool Internet-Enabled Appliances to Use Beeline Shopper Software Features," http://www.whirlpoocorp.com/news/releases/release.asp?rid=90 (Feb. 16, 2001).

Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).

Callahan et al., "Adapting Software Pipelining for Reconfigurable Computing," in Proceedings of the International Conference on Compilers, Architectrue and Synthesis for Embedded Systems p. 8, ACM (Cases '00, San Jose, CA) (Nov. 17-18, 2000).

Chapman & Mehrotra, "OpenMP and HFP: Integrating Two Paradigms," Proceedings of the 4th International Euro-Par Conference (Euro-Par'98), Springer-Verlag Heidelberg, Lecture Notes in Computer Science 1470:650-658 (1998).

Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).

Clarke, "Embedded Solutions Enters Development Pact with Marconi," EETimes Online (Jan. 26, 2000).

Compton & Hauck, "Reconfigurable Computing: A Survey of Systems and Software," ACM Press, ACM Computing Surveys (CSUR) 34(2):171-210 (Jun. 2002).

Compton et al., "Configuration Relocation and Defragmentation for Run-Time Reconfigurable Computing," Northwestern University, http://citeseer.nj.nec.com/compton00configuration.html, pp. 1-17 (2000).

Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).

Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).

Cray Research Inc., "Cray T3E Fortran Optimization Guide," Ver. 004-2518-002, Section 4.5 (Jan. 1999).

Cummings et al., "FPGA in the Software Radio," IEEE Communications Magazine. 37(2):108-112 (Feb. 1999).

Dandalis et al., "An Adaptive Cryptographic Engine for IPSec Architectures," IEEE pp. 132-141 (Jan. 2000).

David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).

Deepakumara et al., "FPGA Implementation of MD5 has Algorithm," Canadian Conference on Electrical and Computer Engineering, IEEE (2001).

Dehon et al., "Reconfigurable Computing: What, Why and Implications for Design Automation," Design Automation Conference Proceedings pp. 610-615 (1999).

Dipert, "Figuring Out Reconfigurable Logic," EDN 44(16):107-114 (Aug. 5, 1999).

Dominikus, "A Hardware Implementation of MD4-Family Hash Algorithms,"9th International Conference on Electronics, Circuits and Systems IEEE (2002).

Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).

Drozdowski, "Scheduling Multiprocessor Tasks—An Overview," Instytut Informatyki Politechnika, pp. 1-31 (Jan. 31, 1996).

Ebeling et al., "RaPiD Reconfigurable Pipelined Datapath,"Springer-Verlag, 6th International Workshop on Field-Programmable Logic and Applications pp. 126-135 (1996).

Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).

Fisher, "Gone Flat," Forbes pp. 76-79 (Oct. 2001).

Fleischmann et al., "Prototyping Networked Embedded Systems," Integrated Engineering, pp. 116-119 (Feb. 1999).

Forbes "Best of the Web—Computer Networking/Consumer Durables," *The Forbes Magnetic 40* p. 80 (May 2001).

Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).

Gluth, "Integrierte Signalprozessoren," Elektronik 35(18):112-118 Franzis Verlag GMBH, Munich, Germany (Sep. 5, 1986).

Gokhale & Schlesinger, "A Data Parallel C and Its Platforms," Proceedings of the Fifth Symposium on the Frontiers of Massively Parallel Computation pp. 194-202 (Frontiers '95) (Feb. 1995).

Grimm et al., "A System Architecture for Pervasive Computing," Washington University, pp. 1-6 (Sep. 2000).

Halbwachs et al., "The Synchronous Data Flow Programming Language LUSTRE," Proceedings of the IEEE 79(9):1305-1319 (Sep. 1991).

Hammes et al., "Cameron: High Level Language Compilation for Reconfigurable Systems," Proc. of the Intl. Conf. on Parallel Architectures and Compilation Techniques, pp. 236-244 (Oct. 1999).

Hartenstein, "Coarse Grain Reconfigurable Architectures," Design Automation Conference, 2001. Proceedings of the ASP-Dac 2001, Asian South Pacific Jan. 30, 2001-Feb. 2, 2001, Piscataway, Nj, US, IEEE, pp. 564-569 (Jan. 30, 2001).

Heinz, "An Efficiently Compilable Extension of {M}odula-3 for Problem-Oriented Explicitly Parallel Programming," Proceedings of the Joint Symposium on Parallel Processing (May 1993).

Hinden et al., "The DARPA Internet: Interconnecting Heterogeneous Computer Networks with Gateways," IEEE Computer Magazine pp. 38-48 (1983).

Horton, "Beginning Java 2: JDK 1.3 Edition," Wrox Press, Chapter 8, pp. 313-316 (Feb. 2001).

Huff et al., "Lifetime-Sensitive Modulo Scheduling," 6th Conference on Programming Language, Design and Implementation, pp. 258-267, ACM (1993).

IBM, "Multisequencing a Single Instruction Stream Scheduling with Space-time Trade-offs," IBM Technical Disclosure Bulletin 36(2):105-108 (Feb. 1, 1993).

IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).

Internet Wire, Sunbeam Joins Microsoft in University Plug and Play Forum to Establish A "Universal" Smart Appliance Technology Standard (Mar. 23, 2000).

Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).

Isoworth, "Isoworth Beverage Dispensing Technology Worldwide Company," Brochure (May 22, 2000).

Jain et al., "An Alternative Approach Towards the Design of Control Units," Microelectronics and Reliability 24(6):1009-1012 (1984).

Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).

Janssen et al., "Partitioned Register File for TTAs," Proceedings of the 28th Annual International Symposium on Microarchitecture, pp. 303-312 (Nov. 1995).

Jong-Pyng et al., "Real-Time Virtual Channel Flow Control," Proceedings of the Annual International Phoenix Conference on Computers and Communications, Conf. 13, pp. 97-103, (Apr. 12, 1994).

Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).

Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).

Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).

Lee & Messerschmitt, "Pipeline Interleaved Programmable DSP's: Synchronous Data Flow Programming,"IEEE Transactions on Acoustics, Speech, and Signal Processing ASSP-35(9):1334-1345 (Sep. 1987).

Lee & Messerschmitt, "Synchronous Data Flow," Proceedings of the IEEE 75(9):1235-1245 (Sep. 1987).

Lee & Parks, "Dataflow Process Networks," Proceedings of the IEEE 83(5):773-799 (May 1995).

Liu et al., "Scheduling Algorithms for Multiprogramming in a Hard-Real-Time Environment," *Journal of the Association for Computing* 20(1):46-61 (1973).

Llosa et al., "Lifetime-Sensitive Modulo Scheduling in a Production Environment," IEEE Trans. on Comps. 50(3):234-249 (Mar. 2001).

Lu et al., "The Morphosys Dynamically Reconfigurable System-On-Chip," Proceedings of the First NASA/DOD Workshop on Evolvable Hardware, pp. 152-160 (Jul. 19, 1999).

Mangione-Smith et al., "Seeking Solutions in Configurable Computing," *Computer* 30(12):38-43 (Dec. 1997).

Manion, "Network CPU Adds Spice," Electronic Engineering Times, Issue 1126 (Aug. 14, 2000).

Mascia & Ishii., "Neural Net Implementation on Single-Chip Digital Signal Processor," IEEE (1989).

McGraw, "Parallel Functional Programming in Sisal: Fictions, Facts, and Future," Lawrence Livermore National Laboratory pp. 1-40 (Jul. 1993).

Najjar et al., "High-Level Language Abstraction for Reconfigurable Computing," *Computer* 36(8):63-67 (Aug. 2003).

Nichols et al., "Data Management and Control-Flow Constructs in SIMD/SPMD Parallel Language/Compiler," Proceedings of the 3rd Symposium on the Frontiers of Massively Parallel Computation pp. 397-406 (Oct. 1990).

OpenMP Architecture Review Board, "OpenMP C and C++ Application Program Interface," pp. 7-16 (Oct. 1998).

Oracle Corporation, "Oracle8i JDBC Developer's Guide and Reference," Release 3, 8.1.7, pp. 10-8-10-10 (Jul. 2000).

Pauer et al., "Algorithm Analysis and Mapping Environment for Adaptive Computing Systems: Further Results," Proc. IEEE Symposium on FPGA's for Custom Computing Machines (FCCM), Napa CA (1999).

Pauer et al., "Algorithm Analysis and Mapping Environment for Adaptive Computing Systems," Presentation slides, Third Bi-annual Ptolemy Miniconference (1999).

Ramamritham et al., "On Scheduling Algorithms for Real-Time Multiprocessor Systems," Algorithms and Applications, Proceedings of the International conference on Parallel Processing 3:143-152 (Aug. 8, 1989).

Schneider, "A Parallel/Serial Trade-Off Methodology for Look-Up Table Based Decoders," Proceedings of the Design Automation Conference 34:498-503 (Jun. 9-13, 1997).

Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.eduzSzPublicationsZSzsidhu__fp100.pdf/sidhu00selfreconfigurable.pdf retrieved on Jun. 21, 2006 (Sep. 1, 2001).

Smith, "Intro to ASICs: ASIC Cell Libraries," at http://iroi.seu.edu.cn/books/asics/Book2/CH01/CH01.5.htm, printed on Feb. 4, 2005 (Jun. 1997).

Souza, "Computing's New Face—Reconfigurable Devices Could Rattle Supply Chain," Electronic Buyers' News Issue 1205, pg. P.1 (Apr. 3, 2000).

Souza, "Quicksilver Buys White Eagle," Electronic Buyers News, Issue 1220 (Jul. 17, 2000).

Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).

Steiner, "Coke Chief's Latest Daft Idea—A Cola Tap in Every House," Sunday Times (Mar. 2001).

Sun Microsystems, "Fortran 3.0.1 User's Guide, Revision A," pp. 57-68 (Aug. 1994).

Svensson, "Co's Join On Home Web Wiring Network," Associated Press Online printed Apr. 30, 2008 (Jun. 2000).

Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "VITURBO: A Reconfigurable Architecture for Ubiquitous Wireless Networks," A Thesis Submitted in Partial Fulfillment of the Requirements for the Degree Master of Science; RICE University (Aug. 2002).

Wang et al., "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

WWW.BESTROM.COM, BreakMateTM from www.bestrom.com printed on Apr. 29, 2008.

WWW.BEVERAGEEXPRESS.com, Beverage Express from www.beverageexpress.com printed on Apr. 30, 2008.

WWW.BEVSTAR.COM, Isoworth Beverage Dispensing Technology Worldwide from www.bevstar.com printed on Apr. 30, 2008.

WWW.BONATOR.COM, from The World Wide Web at http://web.archive.org/web/20000510102440/http://www.bonator.com/ printed on Apr. 30, 2008.

WWW.ECOMMERCE.DEWPOINTINC.COM, Swiss Mountain Coffees from www.ecommerce.dewpointinc.com printed on Apr. 30, 2008.

WWW.GATEWAY.COM, World Wide Web, http://web.archive.org/web/20000229192734/www.gateway.com/productpages/9300splash/index.shtml Available on Mar. 3, 2000, 1 page (Mar. 3, 2000).

WWW.ICL.COM, from the World Wide Web at http://www.icl.com printed on Apr. 30, 2008.

WWW.MARGHERITA2000.COM; from Margherita2000.com printed Apr. 30, 2008 (Jan. 26, 2001).

WWW.SODACLUBENTERPRISES.COM, Soda-Club Enterprises from www.sodaclubenterprises.com printed on Apr. 30, 2008.

WWW.SYMBOL.COM, Symbol from www.symbol.com printed on Apr. 30, 2008.

WWW.WUNDERBAR.com, Wunder-Bar Dispensing Systems from www.wunderbar.com printed on Apr. 30, 2008.

Xilinx, "Virtex-II Pro Platform FPGAs: Functional Description DS083-2 (v2.5)," Product Specification, pp. 13-46 (Jan. 20, 2003).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 (1994).

Zaino et al., "Algorithm Analysis and Mapping Environment for Adaptive Computing Systems," Final Technical Report, DARPA Contract F33615-97-C-1174 (Sep. 2001).

Zhang et al., "A 1V Heterogeneous Reconfigurable Processor IC for Baseband Wireless Applications," 2000 IEEE Solid.

* cited by examiner

CORRELATION RESULTS BETWEEN $$D_0 \to D_{255} \text{ AND } \begin{pmatrix} X_0 \to X_{255} & \otimes & Y_0 \to X_{255} \\ X_{16} \to X_{271} & \otimes & Y_0 \to Y_{255} \\ X_{32} \to X_{287} & \otimes & Y_0 \to Y_{255} \\ \\ X_{112} \to X_{367} & \otimes & Y_0 \to Y_{255} \end{pmatrix}$$

⇓

$D_0 X_0 Y_0 + D_1 X_1 Y_1 + D_2 X_2 Y_2 + \ldots + D_{255} X_{255} Y_{255}$ $D_0 X_{16} Y_0 + D_1 X_{17} Y_1 + D_2 X_{18} Y_2 + \ldots + D_{255} X_{271} Y_{255}$ $D_0 X_{32} Y_0 + D_1 X_{33} Y_1 + D_2 X_{34} Y_2 + \ldots + D_{255} X_{287} Y_{255}$

⋮

$D_0 X_{112} Y_0 + D_1 X_{113} Y_1 + D_2 X_{114} Y_2 + \ldots + D_{255} X_{367} Y_{255}$

FIG. 7A

CORRELATION RESULTS BETWEEN $$D_0 \to D_{15} \text{ AND } \begin{pmatrix} X_0 \to X_{15} & \otimes & Y_0 \to X_{15} \\ X_{16} \to X_{31} & \otimes & Y_0 \to Y_{15} \\ X_{32} \to X_{47} & \otimes & Y_0 \to Y_{15} \\ \\ X_{112} \to X_{127} & \otimes & Y_0 \to Y_{15} \end{pmatrix}$$

⇓

$D_0 X_0 Y_0 + D_1 X_1 Y_1 + D_2 X_2 Y_2 + \ldots + D_{15} X_{15} Y_{15}$ $D_0 X_{16} Y_0 + D_1 X_{17} Y_1 + D_2 X_{18} Y_2 + \ldots + D_{15} X_{31} Y_{15}$ $D_0 X_{32} Y_0 + D_1 X_{33} Y_1 + D_2 X_{34} Y_2 + \ldots + D_{15} X_{47} Y_{15}$

⋮

$D_0 X_{112} Y_0 + D_1 X_{113} Y_1 + D_2 X_{114} Y_2 + \ldots + D_{15} X_{127} Y_{15}$

FIG. 7B

LOW I/O BANDWIDTH METHOD AND SYSTEM FOR IMPLEMENTING DETECTION AND IDENTIFICATION OF SCRAMBLING CODES

CROSS-REFERENCES TO RELATED APPLICATION(S)

This application is a Continuation of application Ser. No. 10/295,692, filed Nov. 14, 2002, now issued as U.S. Pat. No. 7,215,701, which is Continuation-In-Part of application Ser. No. 10/015,531, filed Dec. 12, 2001, now issued as U.S. Pat. No. 7,088,825; both applications are incorporated by reference herein.

BACKGROUND OF THE INVENTION

The present invention generally relates to scrambling codes. More specifically, the present invention relates to a method and system for detecting scrambling codes within a W-CDMA communication system.

Code acquisition is a fundamental algorithm required in any direct sequence spread spectrum (DSSS) receiver. Prior to de-spreading, demodulating and decoding frames, such a receiver needs to acquire knowledge of timing information relating to the underlying spreading waveform being used to spread the data-bearing signal. According to the wide-band code division multiple access (W-CDMA) communication system of the 3GPP standards body, upon turning on a mobile terminal or device, a 3-step initial cell search procedure needs to be performed to acquire the primary scrambling code which is used to spread the data bearing channels. Examples of such channels are the primary common pilot channel (P-CPICH) and the dedicated physical channel (DPCH).

The first step of the 3-step initial cell search procedure relates to slot timing. In a W-CDMA communication system, each base station transmits its own scrambling code in frames over the air to a mobile terminal. Each frame is made up of fifteen (15) slots. Before the start of a frame can be located, the start of a slot needs to be identified first. Once the start of a slot is identified, then it can be assured that one of the next fifteen (15) slots represents the start of a frame. Upon conclusion of the first step, the start of a slot is identified.

The second step of the 3-step initial cell search procedure relates to frame timing. As mentioned above, at the end of the first step, the start of a slot is identified. Once that is achieved, the start of a frame can then be identified. Within a W-CDMA communication system, there are five hundred and twelve (512)base stations within the network. The base stations are identified in the network by a network matrix. The network matrix has sixty-four groups (64) and each group has eight (8) cells. A particular base station is identified by its group and its cell position within the group. During this second step, the start of a frame is identified and the mobile terminal can then synchronize to the identified frame and obtain information relating to group identification. Upon conclusion of the second step, the group which contains the base station that sent out the frame (or scrambling code) is identified, i.e., one out of sixty-four (64) group is identified.

Upon completing the first two steps of the initial cell search procedure, the receiver has knowledge of the slot and frame timing of the received scrambling code, such as a P-CPICH signal. The receiver also has knowledge of the group identification of the base station or cell being acquired. The group identification information contains information on all eight (8) primary cells within the group. Since there are eight (8) cells in a group, using the group identification information, the receiver needs only to identify one (1) out of eight (8) possible primary cells from the group.

To achieve this goal, the receiver may use one of two conventional approaches. Under the first approach, the receiver may perform a correlation of the received signals with a parallel bank of eight (8) scrambling code generators (typical correlation length N ranges from 64 to 256 chips based on frequency offset in the received signals). All the eight (8) correlations are performed within N chips, at the expense of using eight (8) parallel scrambling code generators.

Under the second approach, the receiver may sequentially correlate the received signals with eight (8) possible scrambling codes for N chips each. Using a single scrambling code generator, one may attain all eight (8) correlation results after slightly greater than 8*N chips (this number of chips is needed to allow for reassigning the scrambling code generator to another phase offset, after each correlation is performed), Implementations may not be limited to the above two conventional approaches. The above two approaches were explained for the case of real time processing of the CDMA signal, i.e. no buffering of received data was assumed for these two cases.

As mentioned above, the eight (8) scrambling codes may be generated in parallel, using eight (8) separate scrambling code generators each operating independently, or the eight (8) scrambling codes maybe generated using a single scrambling code generator using eight (8) sets of masks (a set=4 18-bit masks). However, both of these approaches require additional power consumption/silicon area. Under the first approach, additional scrambling code generators are needed; and under the second approach, additional memory storage is needed to store the received signals and it takes additional time to generate and process the necessary scrambling codes in a sequential manner.

Hence, it would be desirable to provide a method and system which is capable of generating scrambling codes for correlation to identify a received scrambling code in a more efficient manner.

SUMMARY OF THE INVENTION

An exemplary method of the present invention is used to perform scrambling code detection of eight (8) primary cells (each scrambling code's X-component being spaced sixteen (16) chips apart) in a group. According to the exemplary method, a single scrambling code generator is used to generate a master scrambling code. The master scrambling code is then used to create individual scrambling codes which are used in correlation with received signals to detect in parallel which one of the eight (8) possible primary cells in the group transmitted the received signals. Each individual scrambling code has a X-component and a Y-component. The individual scrambling codes are created based on the fact that the X-component of each cell station's scrambling code's phase reference is spaced sixteen (16) chips apart.

The use of this exemplary method reduces the complexity of scrambling code or PN generator(s) in the parallel search implementation. More specifically, the use of this exemplary method avoids the need to utilize parallel logic to generate eight (8) scrambling codes. Since the X-component of each primary scrambling code within a group is sixteen (16) chips apart, a pair of buffers (one for the X-component and one for the Y-component) is used to store a sequential stream of X- and Y-components of the master scrambling code (typically the first primary code with a group) output respectively from a single scrambling code generator. Since the Y-component is common to all primary cells in the group, the Y-component is correlated with different portions of the X-component (each portion being offset by a multiple of sixteen (16) locations from the X-component buffer) to generate all eight (8) individual scrambling codes in the group. That is, using different 16-chip offsets in the X-component buffers (complex samples) and a common Y-component buffer (complex samples), all eight (8) different complex individual scrambling codes can be generated. The received data is then correlated in parallel with each of the eight (8) individual scrambling codes generated from the master scrambling code. Eight dimensions are mapped to a single dimension at the expense of a slight increase in storage size.

This exemplary method can be used as part of an overall 3-step initial cell search procedure to acquire the downlink of a 3GPP WCDMA cell, which more specifically corresponds to part of the stage 3 portion of the cell search procedure.

According to an exemplary implementation of the exemplary method of the present invention, the exemplary implementation includes a single scrambling code generator and eight (8) correlators arranged in sequential order. Each of the correlators maintains a corresponding segment of the master scrambling code's X-component and a common segment of the Y-component. For every sixteen (16) chips, a new segment of the master scrambling code's X-component is introduced into one of the correlators by the scrambling code generator, a segment of the master scrambling code's X-component is dropped from another correlator, and segments of the master scrambling code's X-component are sequentially shifted or propagated through the remaining correlators; and concurrent correlations are performed by the correlators using their respective corresponding segments of the master scrambling code and newly received signals. The foregoing process is repeated until a desired correlation length is achieved.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 7a is a diagram illustrating correlation results generated by the exemplary method shown in FIG. 3 in accordance with the present invention; and FIG. 7b is a diagram illustrating correlation results generated after one iteration by the exemplary implementation shown in FIG. 6 in accordance with the present invention.

DETAILED DESCRIPTION OF THE INVENTION

Figure 1A:
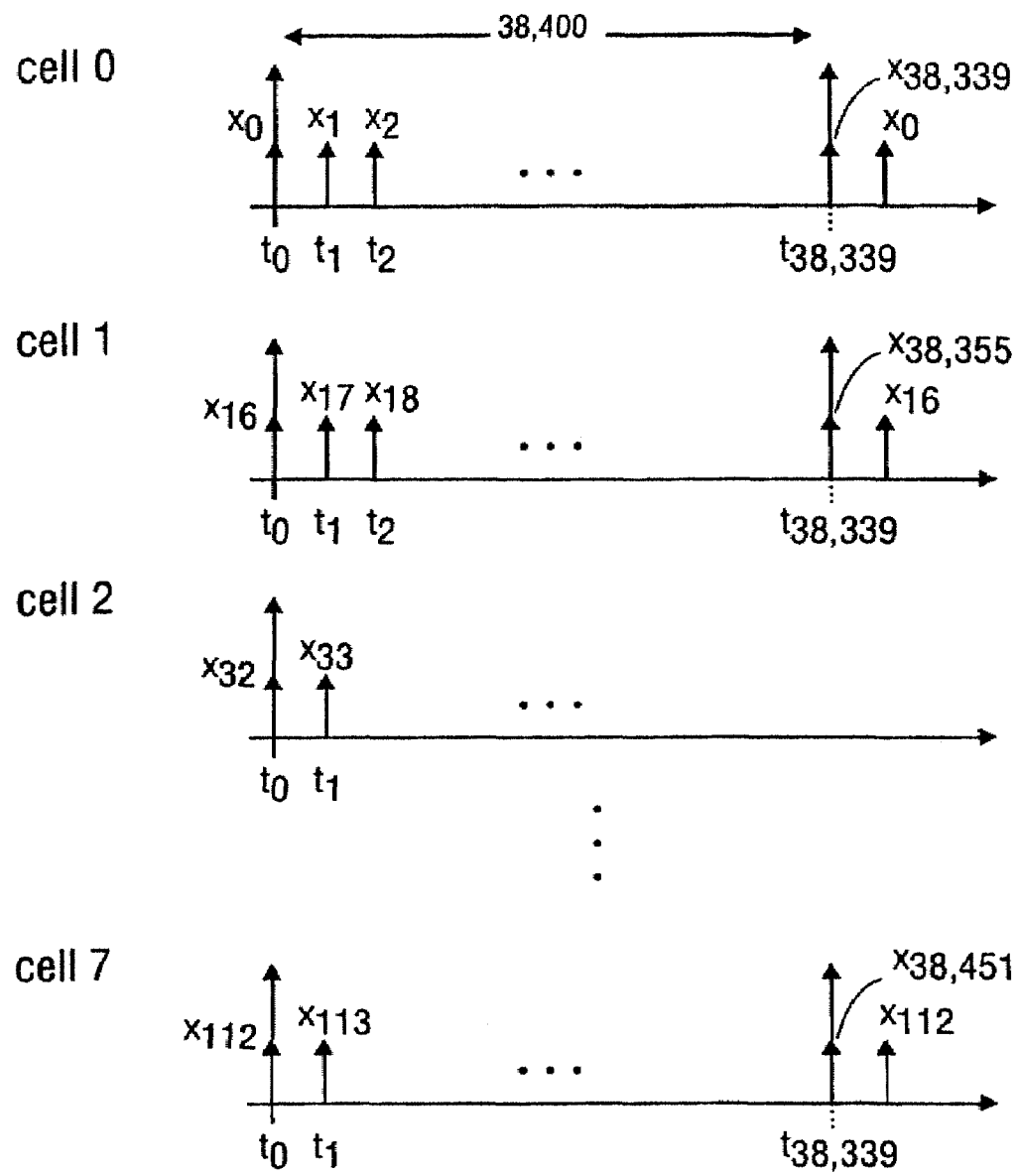
FIG. 1a is a simplified diagram illustrating the timing of the X-components of the scrambling codes of the eight (8) cells within a group.
Figure 1B:
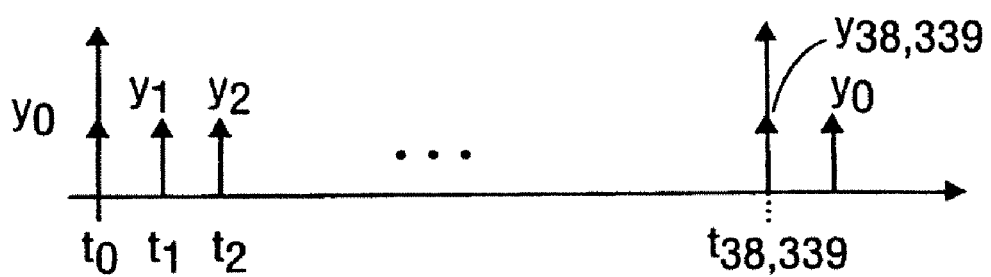
FIG. 1b is a simplified diagram illustrating the timing of the Y-components of the scrambling codes of the eight (8) cells within a group.

The present invention in the form of one or more exemplary embodiments will now be discussed. The present invention can be applied to the third step of the initial cell search procedure when a mobile terminal is initially powered on to identify the base station or cell which transmitted the received signals containing a scrambling code. FIG. 1a is a simplified diagram illustrating the timing of the X-components of the scrambling codes of the eight (8) cells within a group. Referring to FIG. 1a, the scrambling code of each cell is transmitted on a periodic basis and the period of the scrambling code of each cell is thirty-eight thousand and four hundred (38,400) chips, i.e., the scrambling code of each cell is repeated after 38,400 chips. For example, for cell "0", $X_0$ is generated internally within a scrambling code generator at $t_0$ and at $t_{38,400}$. Furthermore, the X-components of the scrambling codes of any two adjacent cells are offset by sixteen (16) chips. For example, cells "0" and "1" transmit $X_0$ and $X_{16}$ respectively at $t_0$. The scrambling codes of all the cells within the group are transmitted at the same frame boundary. By having a 16-chip offset between two adjacent cells, the X-components of the scrambling codes between two adjacent groups of cells are offset by one hundred and twenty-eight (128)(16*8=128). It should be noted that the Y-components of all the scrambling codes for a group of cells are the same, i.e., there is no offset between the Y-components of adjacent scrambling codes. FIG. 1b is a simplified diagram illustrating the timing of the Y-components of the scrambling codes of the eight (8) cells within a group.

According to one exemplary method of the present invention, a scrambling code represented by the received signals is identified by using a single scrambling code generator to attain N chip correlation of the received signals with eight (8) primary scrambling codes in a group within N+16*7=N+112 chips.

Figure 2:
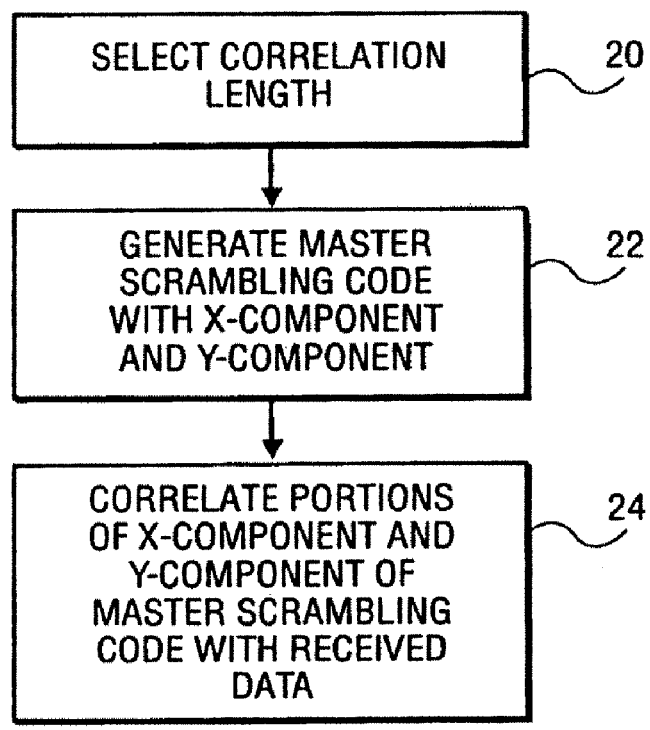
FIG. 2 is a flow diagram illustrating an exemplary method of the present invention.

FIG. 2 is a flow diagram illustrating an exemplary method of the present invention. Referring to FIG. 2, at 20, the correlation length N is first determined. The correlation length N is the amount of time during which correlation between the received signals and the generated scrambling codes is summed up. The correlation length N is selected such that reasonable correlation results can be obtained. Typical values of the correlation length N range from sixty-four (64) to two hundred and fifty-six (256), depending on the relative carrier frequency offset between the transmitted and received signals. A person of ordinary skill in the art will know how to select the proper correlation length. Next, at 22, using the selected correlation length, the chip offset (CO) between two adjacent scrambling codes, and the number of cells (C) within a group, a master scrambling code is generated. The master scrambling code has a X-component and a Y-component. The X-component and the Y-component are respectively stored in a X-component buffer and a Y-component buffer for subsequent use in generating possible scrambling codes from all the cells in an identified group. The master scrambling code has a period, e.g., 38,400 chips, which is sufficient to allow correlations to be performed reliably. N+CO*(C−1) corresponds to the amount of the code's X-component that needs to be generated to perform a correlation of length N with C cells spaced CO chips apart. Also, at the same time, N complex samples of the code's Y-component need to be generated. It should be noted that the product term CO*C represents the chip offset between the X-components of the respective scrambling codes of the first cells of two adjacent groups of base stations or cells. As mentioned above, during the first two steps of the initial cell search procedure, the start of the frame containing the scrambling code is identified and group identification information relating to the group which includes the cell that transmitted the received signals is available. With this information, the group which includes the cell that transmitted the received signals is identified. Moreover, using this information, the proper master scrambling code which covers all the possible scrambling codes from all the cells within the identified group can be generated. At 24, portions of the master scrambling code's X-component buffer are used, along with the common Y-component buffer, to create individual scrambling codes which correspond to the cells within the identified group. These individual scrambling codes are then correlated with the received signals in a parallel manner to determine which of the cells within the identified group transmitted the received signals.

The following is an example illustrating the exemplary method of the present invention. The example is based on the following assumptions: the correlation length N is two hundred and fifty-six (256); the chip offset CO is sixteen (16); and the number of cells C within the identified group is eight (8). The period of the master scrambling code is thirty-eight thousand and four hundred (38,400) chips.

Next, three hundred and sixty-eight (368) chips ($X_0 \rightarrow X_{367}$) of the master scrambling code's X-component, as well as two hundred and fifty-six (256) chips ($Y_0 \rightarrow Y_{255}$) of the master scrambling code's Y-component, are generated from a single scrambling code generator tuned to the first primary cell of the underlying identified group. The length of three hundred and sixty-eight (368) chips is determined based on the formula N+CO*(C−1) which, in this case, equals to 256+16*(8−1)=256+16*7=256+112=368. The length of chips for the Y-component is determined by the correlation length N, which in this case is two hundred and fifty-six (256). It should be noted that it is not necessary to generate all three hundred and sixty-eight (368) chips and all two hundred and fifty-six (256) Y-component chips prior to correlation. The generation of three hundred and sixty-eight (368) chips is specified to emphasize the total number of chips required out of the scrambling code generator's X-component to implement eight (8) parallel correlations of two hundred and fifty-six (256) chips each.

Figure 3:
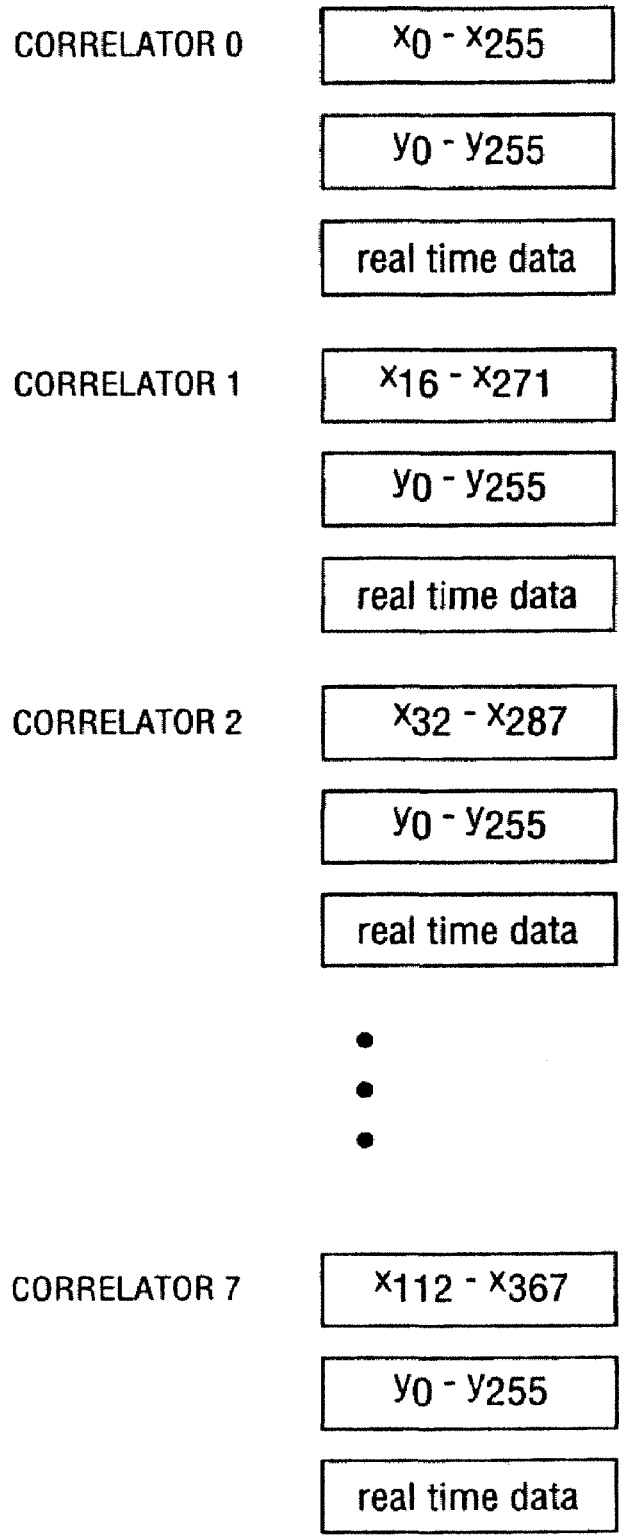
FIG. 3 is a simplified diagram illustrating parallel correlations of eight (8) cells in a group using a single scrambling code generator according to the present invention.

FIG. 3 is a simplified diagram illustrating parallel correlations of eight (8) cells in a group using a single scrambling code generator. As shown in FIG. 3, each of the eight (8) correlators correlates the received signals or real-time data ($D_0 \rightarrow D_{255}$) with two hundred and fifty-six (256) X-component chips and two hundred and fifty-six (256) Y-component chips. The respective X-component chips for the correlators are each generated by operating on different portions of the X-component buffer. As mentioned above, the X-component buffer contains the X-component of the master scrambling code. Furthermore, the respective X-component chips of two adjacent correlators are started at an offset of sixteen (16) chips. The Y-component chips are the same for all correlators. It should be noted that the contents of the X-component buffer and the Y-component buffer are complex. For example, the first correlator correlates the received signals ($D_0 \rightarrow D_{255}$) with the X-component chips ($X_0 \rightarrow X_{255}$) and with the Y-component chips ($Y_0 \rightarrow Y_{255}$); the second correlator correlates the received signals ($D_0 \rightarrow D_{255}$) with the X-component chips ($X_{16} \rightarrow X_{271}$) and again with the Y-component chips ($Y_0 \rightarrow Y_{255}$); and so on, and the final correlator correlates the received signals ($D_0 \rightarrow D_{255}$) with the X-component chips ($X_{112} \rightarrow X_{367}$) and also with the Y-component chips ($Y_0 \rightarrow Y_{255}$). The correlation results are then obtained from each of the correlators. By evaluating the correlation results, the scrambling code represented by the received signals can be identified and, hence, the identity of the base station or cell which transmitted the received signals can also be, determined.

Figure 4:
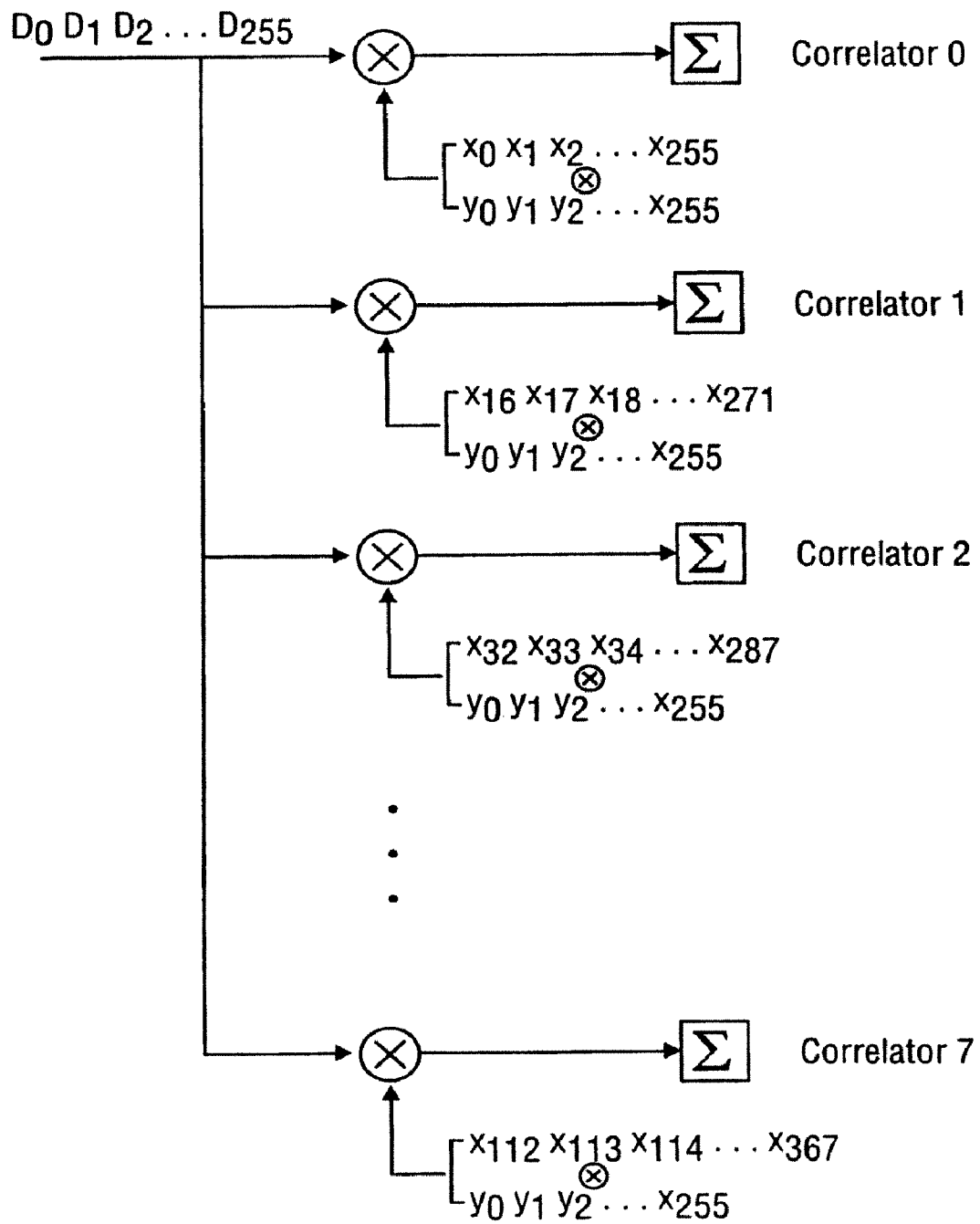
FIG. 4 is a simplified diagram illustrating one exemplary implementation of the exemplary method according to the present invention.

FIG. 4 is a simplified diagram illustrating an exemplary implementation of the exemplary method described above in accordance with the present invention. It is to be noted that the received signals are processed simultaneously in real-time by eight (8) parallel correlators. The scrambling code generator generates an X-component buffer that is three hundred and sixty-eight (368) chips long, i.e., N+112 chips, and a Y-component buffer that is two hundred and fifty-six (256) chips long. This is in contrast to 8*N*2 (*8N for the X-component and *8N for the Y-component) complex chips that must be generated for the alternative approach in the parallel search implementation. Hence, there is a factor of 8N*2/(2N+128) savings on the scrambling code generation complexity using the present invention, which equals to 6.4 for N=256 (an 85% reduction in complexity).

The exemplary method of the present invention as described may be implemented in software, hardware or a combination of both. For example, the exemplary method of the present invention may be implemented as control logic using software embedded in a mobile terminal. When implemented using software, the exemplary method may be implemented in a modular or integrated manner within the mobile terminal. Based on disclosure provided herein, a person of ordinary skill in the art will know of other ways and/or methods to implement the present invention.

Referring to FIG. 3, it can be seen that in accordance with the exemplary method, for a correlation length of two hundred and fifty-six (256), a 16-chip offset between the X-components of the scrambling codes and eight (8) cells within a group, a master scrambling code with a period of thirty-eight thousand and four hundred (38,400) chips is generated. This would require a global storage access of 8N*2 locations (since data is complex) for every N chips of correlation. If hardware resources are not limited, then the master scrambling code and the received signals can be stored in memory registers and each correlator can then read out the corresponding 256-chip scrambling code that it needs to perform the correlation.

Figure 5:
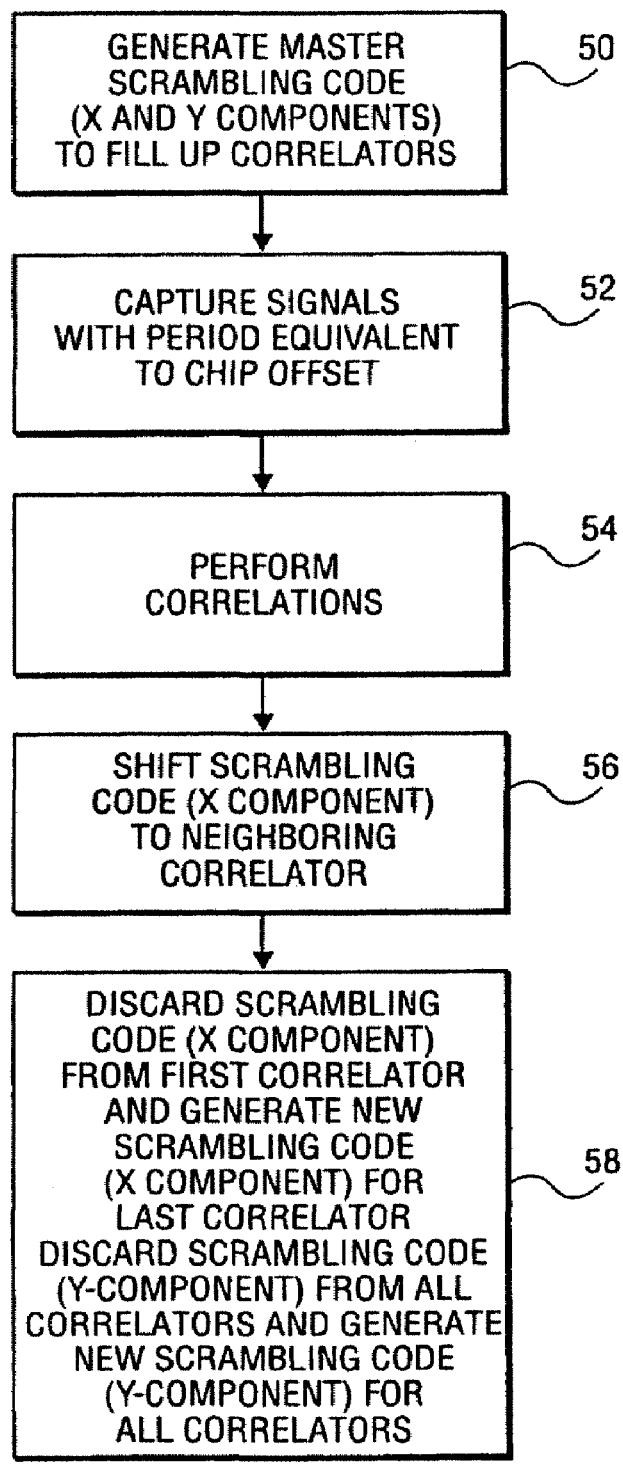
FIG. 5 is a flow diagram illustrating one exemplary implementation of the exemplary method in accordance with the present invention.

FIG. 5 is a flow diagram illustrating an exemplary implementation of the exemplary method described above in accordance with the present invention. As will be illustrated below, the exemplary implementation reduces the storage and access requirements needed to implement the exemplary method in accordance with the present invention. Referring to FIG. 5, at 50, a portion of the master scrambling code is generated to populate the correlators. The generation of the master scrambling code by a single scrambling code generator is described above. As previously described, the master scrambling code has a X-component and a Y-component. The number of correlators and the length of each correlator respectively depend on the number of cells within a group and the chip offset between the X-components of the respective scrambling codes of two adjacent cells within the group. The correlators collectively contain the entire generated portion of the master scrambling code, i.e., each correlator is populated with segments of the X- and Y-components of the generated portion of the master scrambling code. The length of the portion of the master scrambling code's X-component to be generated depends on the chip offset between the X-components of the respective scrambling codes of two adjacent groups of cells. As mentioned above, this chip offset, in turn, depends on the number of cells within a group and the chip offset between the X-components of the respective scrambling codes of two adjacent cells within the group. For instance, for a W-CDMA communication system, there are eight (8) cells in a group and the chip offset between the X-components of the scrambling codes of two adjacent cells within the group is sixteen (16). Hence, the length of the portion of the X-component of the master scrambling code to be initially generated is one hundred and twenty-eight (128=16*8) chips.

At 52, a set of received signals are captured. The duration of the capture period equals to the chip offset between the X-components of the respective scrambling codes of two adjacent cells within a group. For a W-CDMA communication system, the duration of the capture period is thus sixteen (16) chips.

At 54, the set of received signals are correlated with the generated portion of the master scrambling code by the correlators and the correlation results are stored. After the correlations are performed, at 56, each correlator shifts or propagates its segment of the X-component of the generated portion of the master scrambling code to its neighboring correlator and shares a common Y-component segment. The exception being that, at 58, the first correlator discards its current segment of the X-component and the last correlator receives a newly generated segment of the X-component from the single scrambling code generator. In addition, at 58, segments of the Y-component from all the correlators are discarded and a newly generated segment of the Y-component is loaded into all the correlators in parallel. As a result, at any given time, all the correlators share the same segment of the Y-component. Then, the process returns to 52 where the next set of received signals are captured and correlated. The foregoing process is repeated until the entire master scrambling code is generated and correlated. From an alternative perspective, this can be viewed as segments of the X-component of the master scrambling code being correlated in a pipelined fashion on a first-in-first-out basis.

Figure 6A:
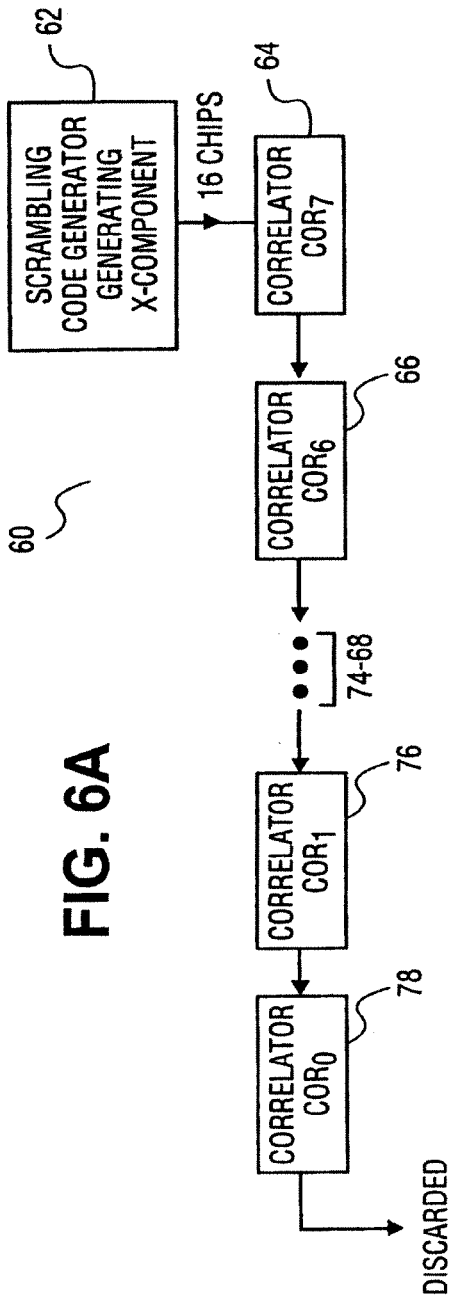
FIGS. 6a and 6b are simplified diagrams illustrating a second exemplary implementation of the exemplary method in accordance with the present invention.
Figure 6B:
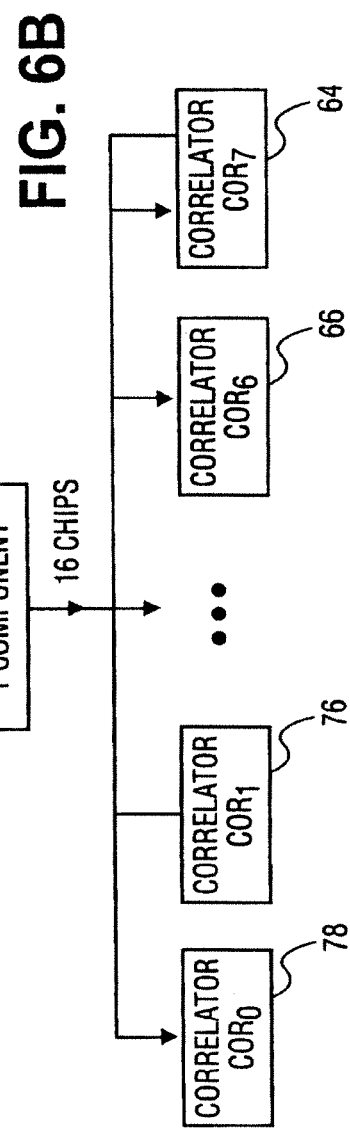

FIGS. 6a and 6b are simplified block diagrams illustrating an exemplary physical implementation of the exemplary method described above. Referring to FIGS. 6a and 6b, there is shown an exemplary system 60 having a single scrambling code generator 62 and eight (8) correlators 64-78. This exemplary system 60 operates based on the following assumptions: there are eight (8) cells in a group; the chip offset between the X-components of the respective scrambling codes of two adjacent cells in a group is sixteen (16) chips; and the correlation length N is selected to be two hundred and fifty-six (256).

The exemplary system 60 operates as follows. Initially, before any correlation is performed, the correlators $COR_0$-$COR_7$ 64-78 are collectively populated with a portion of the master scrambling code's X- and Y-components by the single scrambling code generator 62. The portion of the X-component of the master scrambling code that is initially generated is one hundred and twenty-eight (128=16*8) chips in length ($X_0 \rightarrow X_{127}$) and the portion of the Y-component that is initially generated is sixteen (16) chips in length. The portion of the X-component of the master scrambling code is segmented and populated into the correlators $COR_0$-$COR_7$ 64-78 and the portion of the Y-component is loaded in parallel into all the correlators $COR_0$-$COR_7$ 64-78. Each correlator has a length of sixteen (16). For example, after initial population, correlator $COR_0$ 78 includes scrambling code segment $X_0$-$X_{15}$; correlator $COR_1$ 76 includes segment $X_{16}$-$X_{31}$; and correlator $COR_7$ 64 includes segment $X_{112}$-$X_{127}$; and so on. In addition, all the correlators $COR_0$-$COR_7$ 64-78 also include scrambling code segment $Y_0$-$Y_{15}$. It should be noted that the initial generation of all one hundred and twenty-eight (128) chips of the portion of the X-component of the master scrambling code and the sixteen (16) chips of the portion of the Y-component of the master scrambling code before starting any of the correlations is not required. One of the correlators 64-78 can be started every sixteen (16) chips in a pipelined fashion.

Next, a set of complex data signals or samples which is sixteen (16) chips in length, $D_0$-$D_{15}$, are received and fed to each of the correlators 64-78. Then, each correlator partially correlates the same set of received complex data samples with the complex conjugate of its corresponding scrambling code segment. The corresponding scrambling segment includes a portion of the X-component and a portion of the Y-component. It is to be noted that the respective X-components of the scrambling code segments of any two adjacent correlators have a chip offset of sixteen (16) chips and that the same portion of the Y-component is shared by all the correlators 64-78. For example, the first correlator $COR_0$ 78 correlates the received data samples, $D_0$-$D_{15}$, with the complex conjugate of its corresponding scrambling code segment, $(X_0 \rightarrow X_{15})+j(Y_0 \rightarrow Y_{15})$; the second correlator $COR_1$ 76 correlates the received data samples, $D_0$-$D_{15}$, with the complex conjugate of its corresponding scrambling code segment, $(X_{16} \rightarrow X_{31})+j(Y_0 \rightarrow Y_{15})$; and so on, and the final correlator $COR_7$ 64 correlates the received data samples, $D_0$-$D_{15}$, with the complex conjugate of its corresponding scrambling code segment, $(X_{112} \rightarrow X_{127})+j(Y_0 \rightarrow Y_{15})$. The correlations of the eight (8) correlators 64-78 are performed concurrently in a parallel manner and the correlation results are stored for subsequent evaluation.

After this first iteration of correlations, each correlator passes its current corresponding scrambling code segment (X-component) to a neighboring correlator. It should be noted that each correlator has two neighboring correlators. In effect, with two exceptions which will be described below, this means each correlator also receives a new corresponding scramble code segment (X-component) from another neighboring correlator. Graphically, this is shown as follows: $COR_1 \rightarrow COR_0$, $COR_2 \rightarrow COR_1$, $COR_3 \rightarrow COR_2$, $COR_4 \rightarrow COR_3$, $COR_5 \rightarrow COR_4$, $COR_6 \rightarrow COR_5$. In essence, the scrambling code segments (X-components) are shifted or propagated along the correlators 64-78. The two exceptions are the first correlator $COR_0$ 78 and the last correlator $COR_7$ 64. For the first correlator $COR_0$ 78, its current corresponding scramble code segment (X-component) is discarded; and for the last correlator $COR_7$ 64, a new scrambling code segment (X-component) generated by the single scrambling code generator 62 is fed to the last correlator $COR_7$ 64. The newly generated scrambling code segment (X-component) is the next segment of the master scrambling code that follows the scrambling code segment (X-component) that was in the last correlator $COR_7$ 64 before that scrambling code segment (X-component) was transferred to correlator $COR_6$ 66. For example, after the first iteration, the newly generated scrambling code segment (X-component) to be fed into the last correlator $COR_7$ 64 is $X_{128}$-$X_{143}$. This is because scrambling code segment (X-component) $X_{128}$-$X_{143}$ follows scrambling code segment (X-component) $X_{112}$-$X_{127}$ within the master scrambling code. By shifting or transferring the scrambling code segments as described above, the entire master scrambling code is propagated along all the correlators 64-78 and is eventually correlated with the received data samples as described in FIG. 3. Furthermore, along with the generation of the new scrambling code segment (X-component), a new scrambling code segment (Y-component) is also generated. In the present example, the new scrambling code segment (Y-component) is $Y_{16}$-$Y_{31}$ following the previous scrambling code (Y-component) $Y_0$-$Y_{15}$ As described above, the new scrambling code (Y-component) is loaded into all the correlators 64-78 in parallel.

The next set of complex data samples are received, $D_{16}$-$D_{31}$, and loaded into the correlators 64-78. Another iteration of concurrent correlations by the correlators 64-78 is then performed again. The foregoing process of shifting the scrambling code segments, receiving the next set of complex data samples and performing another iteration of correlations is repeated until the master scrambling code is correlated or, conversely, the collective length of all the received complex data samples reaches the correlation length.

FIG. 7a illustrates the correlation results generated using the exemplary method shown in FIG. 3. FIG. 7b illustrates the correlation results after the first iteration of correlations by the exemplary system 60. Comparing FIGS. 7a and 7b, it can be seen that by using the exemplary system 60 shown in FIG. 6, sixteen (16) terms are generated by each of the eight (8) correlations after one iteration. Hence, in order to generate the complete results as shown in FIG. 7a based on a correlation length of two hundred and fifty-six (256), sixteen (16) total iterations are executed.

As can be seen above, scrambling code segments (X- and Y-components) which make up the master scrambling code are internally shared amongst correlators 64-78. For every predetermined period (that is defined by the chip offset between the respective scrambling codes of any two adjacent cells within a group), e.g., sixteen (16) chips, the corresponding scrambling code segment (X-component) of each correlator is refreshed or updated. This sharing of scrambling code segments reduces the access to the otherwise globally stored master scrambling code by a factor of eight (8) (for cases using the above assumptions), i.e., 2N scrambling code read accesses are required every N chips of correlations.

In addition, for every iteration of correlations, the scrambling code generator 62 transfers or generates only 2*2N/16 binary values to one of the correlators 64-78. As mentioned above, the rest of the correlators 66-78 internally share the scrambling code segments which are already present amongst the correlators 64-78.

To further reduce scrambling code memory access as well as each correlator's working size, the technique of packing and unpacking bits may be used. If the above binary values were packed into a word and then unpacked at the time of correlation, the scrambling code generator 62 then needs to transfer only 2*2N/(16*16) 16-bit words to the group of correlators 64-78. That is, the working size of each correlator may be reduced to 2*2N/(16*16) by packing sixteen (16) bits at a time. This also reduces scrambling code storage access to 2*2N/16.

Furthermore, it is understood that while the present invention as described above is applicable to a W-CDMA communication system, it should be clear to a person of ordinary skill in the art that the present invention can be applied to other types of communication systems.

Moreover, it should be noted that the present invention as described herein may be implemented in a number of ways. For example, the present invention may be implemented using the adaptive computing architecture as disclosed in U.S. patent application Ser. No. 09/815,122 entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS," filed on Mar. 22, 2001, the disclosure of which is hereby incorporated by reference in their entirety as if set forth in full herein for all purposes. For instance, using the adaptive computing architecture, the scrambling code generator 62 and the correlators 64-78 may be implemented on demand within a mobile terminal. Based on the disclosure provided herein, a person of ordinary skill in the art will know of other ways and/or methods to implement and apply the present invention.

It is further understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for identifying a scrambling code in received signals comprising:

a scrambling code generator configured to generate a plurality of X-component segments forming a plurality of X-component sequential chips of a master scrambling code and configured to generate a plurality of Y-component segments forming a plurality of Y-component sequential chips of the master scrambling code; and a plurality of correlators configured to correlate in parallel the received signals with corresponding X-component and Y-component segments, a first correlator of the plurality of correlators configured to receive a next corresponding X-component segment generated by the scrambling code generator, each remaining correlator of the plurality of correlators configured to receive its next corresponding X-component segment from another correlator of the plurality of correlators, and each correlator of the plurality of correlators is configured to receive a next corresponding Y-component segment generated by the scrambling code generator.

2. The system of claim 1, wherein a number of correlation iterations are performed by the plurality of correlators, the number of iterations depends on a selected correlation length and a predetermined chip offset; and wherein the length of each correlator of the plurality of correlators depends on the predetermined chip offset.

3. The system of claim 1, wherein, following each correlation, the plurality of correlators are configured to receive a new set of received signals.

4. The system of claim 1, wherein the plurality of correlators are configured to generate correlation results; wherein the correlation results generated by the plurality of correlators are evaluated to identify the scrambling code from the received signals to determine the identity of a base station which transmitted one of the received signals.

5. A system for identifying a scrambling code in received signals comprising:

a scrambling code generator configured to generate a plurality of X-component segments forming a plurality of X-component sequential chips of a master scrambling code and configured to generate a plurality of Y-component segments forming a plurality of sequential chips of the master scrambling code; and a plurality of correlators comprising a first correlator, a last correlator and a plurality of intermediate correlators coupled between the first correlator and the last correlator, the plurality of correlators configured to perform correlations in parallel;

wherein:

each correlator of the plurality of correlators is configured to be populated with a corresponding X-component segment and a corresponding Y-component segment generated by the scrambling code generator;

each of the plurality of correlators is configured to receive a set of received data samples;

the plurality of correlators are configured to correlate the received data samples with corresponding X-component and Y-component segments in parallel and;

after each parallel correlation by the plurality of correlators, the plurality of intermediate correlators and the last correlator are configured to transfer their corresponding X-component segments to another correlator, the first correlator is configured to discard the corresponding X-component segment, and the last correlator is configured to receive a new X-component segment generated by the scrambling code generator, and after each parallel correlation by the plurality of correlators, the plurality of correlators ate configured to receive a next Y-component segment generated by the scrambling code generator.

6. The system of claim 5, wherein the predetermined group chip offset is determined by the number of base stations in a base station group and a predetermined chip offset.

7. The system of claim 1, wherein the number of the plurality of correlators depends on the number of base stations in a base station group in a communication network.

8. The system of claim 7, wherein the communication network is a Wide-band Code Division Multiple Access (W-CDMA) communication network.

9. The system of claim 1, wherein the plurality of correlators perform corresponding correlations in real-time.

10. A mobile terminal incorporating the system of claim 1.

11. The system of claim 1, wherein each X-component segment of the plurality of X-component segments and each Y-component segment of the plurality of Y-component segments has a length of chips determined by a predetermined chip offset.

12. The system of claim 1, wherein a total length of the sequential chips generated of the plurality of Y-component segments is determined by a selected correlation length.

13. A system for identifying a scrambling code in received signals comprising:

a scrambling code generator configured to generate a plurality of X-component segments forming a plurality of X-component sequential chips of a master scrambling code and configured to generate a plurality of Y-component segments forming a plurality of sequential chips of the master scrambling code; and a plurality of correlators comprising a first correlator, a last correlator and a plurality of intermediate correlators coupled between the first correlator and the last correlator, the plurality of correlators configured to perform correlations in parallel;

wherein:

each correlator of the plurality of correlators is configured to be populated with a corresponding X-component segment and a corresponding Y-component segment generated by the scrambling code generator;

each of the plurality of correlators is configured to receive a set of received data samples;

the plurality of correlators are configured to correlate the received data samples with corresponding X-component and Y-component segments in parallel and;

after each parallel correlation by the plurality of correlators, the plurality of intermediate correlators and the last correlator are configured to transfer their corresponding X-component segments to another correlator, the first correlator is configured to discard the corresponding X-component segment, and the last correlator is configured to receive a new X-component segment generated by the scrambling code generator, and after each parallel correlation by the plurality of correlators, the plurality of correlators ate configured to receive a next Y-component segment generated by the scrambling code generator.

14. The system of claim 13, wherein the next Y-component segment sequentially follows the previous Y-component segment utilized by the plurality of correlators.

15. The system of claim 13, wherein, following each correlation, each of the plurality of correlators are configured to receive a new set of received data samples.

16. The system of claim 13, wherein a total length of the X-component sequential chips is determined by a selected correlation length and a predetermined group chip offset.

17. The system of claim 16, wherein the predetermined group chip offset is determined by the number of base stations in a base station group and a predetermined chip offset.

18. A method for identifying a scrambling code in received signals comprising:

selecting a correlation length;

identifying a plurality of X-component segments forming a plurality of X-component sequential chips of a master scrambling code using the selected correlation length;

identifying a plurality of Y-component segments forming a plurality of Y-component sequential chips of the master scrambling code using the selected correlation length;

populating each of a plurality of correlators with a corresponding X-component segment and a corresponding Y-component segment;

providing a set of received data samples to each of the plurality of correlators;

correlating the set of received data samples with its corresponding X-component segment and its corresponding Y-component segment of the corresponding correlator;

transferring the corresponding X-component segments of all but one of the plurality of correlators to their respective next correlators;

populating one of the plurality of correlators with a next sequential X-component segment; and populating the plurality of correlators with the next sequential Y-component segment.

19. The system of claim 18, wherein the communication network is a Wide-band Code Division Multiple Access (W-CDMA) communication network and the system is used in connection with acquisition of a downlink of a 3GPP standards body W-CDMA cell during stage 3 of a cell search procedure.

20. The system of claim 13, wherein the plurality of correlators perform corresponding correlations in real-time.

21. The system of claim 13, wherein the last correlator is configured to receive a next X-component segment which sequentially follows the previous corresponding X-component segment utilized by the last correlator.

22. A mobile terminal incorporating the system of claim 13.

23. The system of claim 13, wherein each X-component segment of the plurality of X-component segments and each Y-component segment of the plurality of Y-component segments has a length of chips determined by a predetermined chip offset.

24. The system of claim 13, wherein a total length of the sequential chips generated of the plurality of Y-component segments is determined by a selected correlation length.

25. A method for identifying a scrambling code in received signals comprising:
selecting a correlation length;
identifying a plurality of X-component segments forming a plurality of X-component sequential chips of a master scrambling code using the selected correlation length;
identifying a plurality of Y-component segments forming a plurality of Y-component sequential chips of the master scrambling code using the selected correlation length;
populating each of a plurality of correlators with a corresponding X-component segment and a corresponding Y-component segment;
providing a set of received data samples to each of the plurality of correlators;
correlating the set of received data samples with its corresponding X-component segment and its corresponding Y-component segment of the corresponding correlator;
transferring the corresponding X-component segments of all but one of the plurality of correlators to their respective next correlators;
populating one of the plurality of correlators with a next sequential X-component segment; and
populating the plurality of correlators with the next sequential Y-component segment.

26. The method of claim 25, further comprising:
storing corresponding correlation results generated by the plurality of correlators; and
evaluating the stored correlation results to identify the scrambling code from the signals received to identify a base station which transmitted one of the received signals.

27. The method of claim 26, wherein the base station is located in a Wide-band Code Division Multiple Access (W-CDMA) communication network and the method is used in connection with acquisition of a downlink of a 3GPP standards body W-CDMA cell during stage 3 of a cell search procedure.

28. The method of claim 25, wherein the plurality of correlators perform the correlation concurrently and in real-time.

29. A mobile terminal configured to utilize the method of claim 25.

30. A method for identifying a scrambling code from received signals comprising:
generating a plurality of X-component segments forming a plurality of X-component sequential chips of a master scrambling code;
generating a plurality of Y-component segments forming a plurality of Y-component sequential chips of the master scrambling code;
iteratively and successively correlating a number of X-component segments of the plurality of X-component segments and a corresponding Y-component segment of the plurality of Y-component segments with corresponding sets of received data samples; and
for each correlation iteration:
providing a new set of received data samples;
correlating the new set of received data samples with the number of X-component segments and with a corresponding Y-component segment; and
after each correlation iteration is completed, refreshing the number of X-component segments in a first-in-first-out basis by discarding one X-component segment and providing another X-component segment, and replacing the current Y-component segment with a new Y-component segment.

31. The method of claim 30, further comprising:
storing correlation results for each correlation iteration; and
evaluating the collectively stored correlation results to identify the scrambling code from the signals received to identify a base station in a communication network which transmitted one of the received signals.

32. The method of claim 31, wherein the communication network is a Wide-band Code Division Multiple Access (W-CDMA) communication network and the method is used in connection with acquisition of a downlink of a 3GPP standards body W-CDMA cell during stage 3 of a cell search procedure.

33. The method of claim 30, wherein for each correlation iteration, the correlating step further comprises:
concurrently correlating the new set of received data samples with each of the number of X-component segments and with the corresponding Y-component segment.

34. A method for identifying a scrambling code in received signals comprising:
identifying a plurality of X-component segments forming a plurality of X-component sequential chips of a master scrambling code;
identifying a plurality of Y-component segments forming a plurality of Y-component sequential chips of the master scrambling code;
configuring a scrambling code generator to generate the plurality of X-component segments one X-component segment at a time;
configuring the scrambling code generator to generate the plurality of Y-component segments one Y-component segment at a time;
configuring a plurality of correlators, the plurality of correlators having a first correlator, a last correlator and a plurality of intermediate correlators coupled between the first correlator and the last correlator;
populating each of the plurality of correlators with a corresponding X-component segment and a corresponding Y-component segment generated by the scrambling code generator;
iteratively and successively correlating corresponding X-component segments and corresponding Y-component segments with corresponding sets of received data samples; and
for each correlation iteration:
providing a new set of received data samples;
correlating the new set of received data samples with corresponding X-component segments and corresponding Y-component segments and storing respective correlation results;
transferring the corresponding X-component segments of the plurality of intermediate correlators and the last correlator to their respective next correlators;
transferring to the last correlator a next corresponding X-component segment generated by the scrambling code generator; and
populating each of the plurality of correlators with a next corresponding Y-component segment from the scrambling code generator.

35. The method of claim 34, wherein the predetermined group chip offset depends on the number of base stations in a base station group in a communication network and a predetermined chip offset between two adjacent base stations in the base station group.

36. The method of claim 34, wherein the number of successive correlation iterations depends on the selected correlation length and the number of X-component segments being correlated during each correlation iteration.

37. A mobile terminal configured to utilize the method of claim 30.

38. The method of claim 30, wherein each X-component segment of the plurality of X-component segments and each Y-component segment of the plurality of Y-component segments has a length of chips determined by a predetermined chip offset.

39. The method of claim 30, further comprising selecting a correlation length; and wherein a total length of the sequential chips generated of the plurality of Y-component segments is determined by a selected correlation length.

40. A method for identifying a scrambling code from received signals comprising:
    identifying a plurality of X-component segments forming a plurality of X-component sequential chips of a master scrambling code;
    identifying a plurality of Y-component segments forming a plurality of Y-component sequential chips of the master scrambling code;
    configuring a scrambling code generator to generate the plurality of X-component segments one X-component segment at a time;
    configuring the scrambling code generator to generate the plurality of Y-component segments one Y-component segment at a time;
    configuring a plurality of correlators, the plurality of correlators having a first correlator, a last correlator and a plurality of intermediate correlators coupled between the first correlator and the last correlator;
    populating each of the plurality of correlators with a corresponding X-component segment and a corresponding Y-component segment generated by the scrambling code generator;
    iteratively and successively correlating corresponding X-component segments and corresponding Y-component segments with corresponding sets of received data samples; and
    for each correlation iteration:
        providing a new set of received data samples;
        correlating the new set of received data samples with corresponding X-component segments and corresponding Y-component segments and storing respective correlation results;
        transferring the corresponding X-component segments of the plurality of intermediate correlators and the last correlator to their respective next correlators;
        transferring to the last correlator a next corresponding X-component segment generated by the scrambling code generator; and
        populating each of the plurality of correlators with a next corresponding Y-component segment from the scrambling code generator.

41. The method of claim 40, further comprising:
    for each correlation iteration, discarding the corresponding X-component segment of the first correlator.

42. The method of claim 40, wherein the plurality of correlators correlate concurrently.

43. The method of claim 40, further comprising:
    selecting a correlation length; and
    wherein a total length of the X-component sequential chips correlated depends on the correlation length and a predetermined group chip offset.

44. The method of claim 43, wherein the predetermined group chip offset depends on the number of base stations in a base station group in a communication network and a predetermined chip offset between two adjacent base stations in the base station group.

45. The method according to claim 44, wherein the communication network is a Wide-band Code Division Multiple Access (W-CDMA) communication network and the method is used in connection with acquisition of a downlink of a 3GPP standards body W-CDMA cell during stage 3 of a cell search procedure.

46. The method of claim 43, wherein the number of successive correlation iterations depends on the selected correlation length and the collective length of the sets of received data samples.

47. A mobile terminal configured to utilize the method of claim 40.

48. The method of claim 40, wherein each X-component segment of the plurality of X-component segments and each Y-component segment of the plurality of Y-component segments has a length of chips determined by a predetermined chip offset.

49. The method of claim 40, further comprising selecting a correlation length; and wherein a total length of the sequential chips of the plurality of Y-component segments identified is determined by a selected correlation length.

* * * * *